US010856465B2

(12) United States Patent
Andre et al.

(10) Patent No.: US 10,856,465 B2
(45) Date of Patent: Dec. 8, 2020

(54) SYSTEMS AND METHODS FOR INHIBITING IMPLEMENT-INDUCED ENGINE STALL, AND TURF MAINTENANCE VEHICLES INCORPORATING SAME

(71) Applicant: EXMARK MANUFACTURING COMPANY, INCORPORATED, Beatrice, NE (US)

(72) Inventors: Timothy D. Andre, Firth, NE (US); Christian S. C. Bryant, Lincoln, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 225 days.

(21) Appl. No.: 15/987,358

(22) Filed: May 23, 2018

(65) Prior Publication Data

US 2019/0357429 A1  Nov. 28, 2019

(51) Int. Cl.
*A01D 34/00* (2006.01)
*F02D 28/00* (2006.01)
*F02D 41/22* (2006.01)
*A01D 34/64* (2006.01)

(52) U.S. Cl.
CPC ......... *A01D 34/006* (2013.01); *A01D 34/001* (2013.01); *A01D 34/64* (2013.01); *F02D 28/00* (2013.01); *F02D 41/22* (2013.01); *B60Y 2200/22* (2013.01); *F02D 2041/228* (2013.01); *F02D 2200/101* (2013.01); *F02D 2200/501* (2013.01)

(58) Field of Classification Search
CPC .... A01D 34/006; A01D 34/001; A01D 34/64; F02D 28/00; F02D 41/22
See application file for complete search history.

(56) References Cited

U.S. PATENT DOCUMENTS

| 5,094,332 | A  | 3/1992  | Wall |
| 5,562,173 | A  | 10/1996 | Olson |
| 5,679,085 | A  | 10/1997 | Fredriksen et al. |
| 6,517,465 | B2 | 2/2003  | Hrazdera |
| 6,609,357 | B1 | 8/2003  | Davis et al. |
| 6,668,530 | B2 | 12/2003 | Kern et al. |
| 6,892,517 | B2 | 5/2005  | Adams et al. |
| 7,588,514 | B2 | 9/2009  | McKenzie et al. |
| 7,666,117 | B2 | 2/2010  | Kawakami et al. |
| 7,669,393 | B2 | 3/2010  | Park et al. |
| 7,669,580 | B2 | 3/2010  | Silbernagel et al. |
| 7,744,503 | B2 | 6/2010  | Kobayashi et al. |
| 7,746,619 | B2 | 6/2010  | Harnett et al. |
| 8,056,695 | B2 | 11/2011 | Silbernagel |
| 8,175,790 | B2 | 5/2012  | Stemler et al. |

(Continued)

OTHER PUBLICATIONS

"SenDEC Soft Start Controller for Electric Clutches," SenDec, Fairport, NY, Updated Jan. 28, 2011; 2 pgs.

*Primary Examiner* — Michael D Lang
(74) *Attorney, Agent, or Firm* — Mueting Raasch Group

(57) ABSTRACT

Systems and methods for inhibiting implement-induced stall of a prime mover associated with a turf vehicle. In some embodiments, the vehicle includes an electronic controller (EC) adapted to monitor a speed of the prime mover and detect when the speed falls below a speed threshold. The EC is adapted to automatically disengage a power take-off (PTO) connecting the prime mover to the implement when the speed of the prime mover falls below this speed threshold.

19 Claims, 5 Drawing Sheets

(56) References Cited

U.S. PATENT DOCUMENTS

| | | |
|---|---|---|
| 8,320,096 B2 | 11/2012 | Harnett |
| 9,002,585 B2 | 4/2015 | Porter et al. |
| 2007/0294017 A1 | 12/2007 | Joshi et al. |
| 2009/0277743 A1* | 11/2009 | Park ..................... A01D 34/828 |
| | | 192/84.1 |
| 2010/0192907 A1 | 8/2010 | Stemler et al. |
| 2014/0083392 A1 | 3/2014 | Cattani et al. |
| 2017/0196164 A1 | 7/2017 | Bryant et al. |
| 2018/0066717 A1* | 3/2018 | Omran ................... B60K 17/28 |

* cited by examiner

SYSTEMS AND METHODS FOR INHIBITING IMPLEMENT-INDUCED ENGINE STALL, AND TURF MAINTENANCE VEHICLES INCORPORATING SAME

The present disclosure relates to turf maintenance vehicles and, more specifically, to systems and methods for inhibiting engine stall due to implement load in such vehicles.

BACKGROUND

Turf maintenance vehicles such as lawn mowers, aerators, and spreader/sprayers are commonly used by homeowners and professionals alike. These vehicles are typically configured as walk-behind or ride-on vehicles having an attached implement such as a grass cutting deck. Within the deck, cutting blades rotate at a speed sufficient to cut vegetation over which the deck passes during operation. The deck (e.g., cutting blades) may be powered by the engine via an implement drive system. A power take-off (PTO) is provided to allow the implement drive system to selectively engage with, and disengage from, the engine. That is, when the PTO is engaged, the engine may effectively power the implement drive system.

During operation, heavy engine loading may occur, for example, when cutting extremely tall or wet grass. In some instances, such loading may ultimately lead to engine stall. Such stalling is undesirable as it not only slows the mowing process, but requires engine restarts. Such restarts are inconvenient and may unnecessarily increase wear on various components (e.g., battery and starter), potentially shortening component life.

Moreover, operators may not always immediately restart the engine once a stall has occurred. As the stall is typically the result of operating under heavy load, the engine and its components may be at higher-than-normal temperature at the time of stall. If the engine is not subsequently restarted, the engine is unable to circulate coolant and/or oil, nor is it typically able to drive cooling fans. As a result, engine temperatures may continue to rise after stall, increasing the chances of heat-related damage to various engine components. For example, a turbocharged engine often uses engine oil to cool the turbocharger bearings. If oil flow is terminated (i.e., upon engine stall), the bearings may overheat, potentially leading to premature bearing failure.

SUMMARY

Embodiments described herein may provide systems and methods that reduce the instances of engine stall. For example, in one embodiment, a method for inhibiting implement-induced stall of a prime mover powering a turf maintenance vehicle is provided. The method includes monitoring, with an electronic controller (EC) associated with the vehicle, one or both of a speed of the prime mover and a speed of an implement powered by the prime mover while a power take-off (PTO) operatively connecting an output of the prime mover to the implement is engaged. The method further includes: detecting, with the EC, when one or both of the speed of the prime mover and the speed of the implement falls below a speed threshold; and automatically disengaging, with the EC, the PTO to operatively disconnect the prime mover from the implement before the prime mover stalls.

In another embodiment, a method for inhibiting implement-induced stall of an engine powering a turf maintenance vehicle is provided that includes: engaging a power take-off (PTO) to operatively connect an output of the engine to an input of a cutting deck attached to the vehicle; operating the cutting deck while the vehicle is travelling over a ground surface; and monitoring, with an electronic controller (EC) associated with the vehicle, one or both of: a speed of the engine; and a speed of the cutting deck. The method further includes: detecting, with the EC, when one or both of the speed of the engine and the speed of the cutting deck falls below a speed threshold; and automatically disengaging, with the EC, the PTO to operatively disconnect the engine from the cutting deck when one or both of the speed of the engine and the speed of the cutting deck falls below the speed threshold.

In still another embodiment, a turf maintenance vehicle is provided that includes: a chassis; ground-engaging members supporting the chassis upon a ground surface; an implement attached to the chassis and adapted to perform a turf maintenance function; and a prime mover supported by the chassis and adapted to power the implement. A power take-off (PTO) is also provided and adapted to selectively couple an output of the prime mover to an input of the implement to provide power the implement. An electronic controller (EC) associated with the PTO may monitor one or both of a speed of the prime mover and a speed of the implement. The EC is further adapted to detect when one or both of the speed of the prime mover and the speed of the implement falls below a speed threshold, and automatically disengage the PTO to operatively de-couple the prime mover from the implement when one or both of the speed of the prime mover and the speed of the implement falls below the speed threshold.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
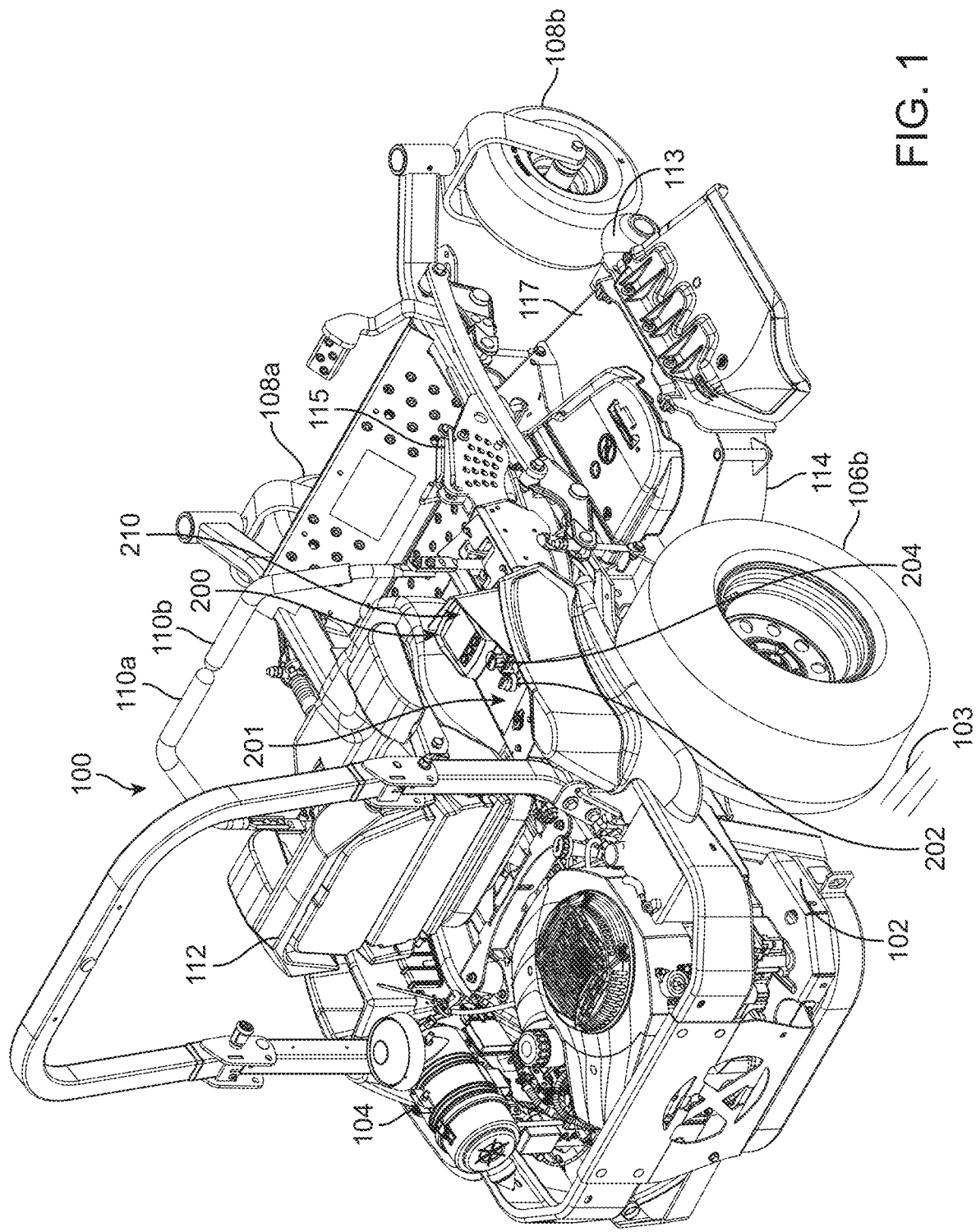
FIG. 1 illustrates a turf maintenance vehicle (e.g., a riding lawn mower) having a stall inhibiting or anti-stall system in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings and subheadings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Generally speaking, embodiments of the present disclosure are directed to turf maintenance vehicles such as lawn mowers and, more particularly, to systems and methods for inhibiting implement-induced stall of a prime mover (e.g., internal combustion engine, electric motor, etc.) resulting from high loading. Such loading may result from operation of an attached or otherwise carried implement (e.g., lawn mower cutting deck). For example, upon encountering tall and/or wet grass, cutting load—and thus engine/motor load—may increase substantially. At some point, this loading may reduce engine/motor speed to a speed threshold below which stall may occur. Systems and methods in accordance with embodiments of the present disclosure, however, may terminate power to the implement (disengage a power take-off (PTO)) before stall occurs. Moreover, systems and methods as described herein may latch the implement off until the operator proactively executes a reset action to re-engage the implement.

As used herein, the term "stall" refers to a threshold speed of an engine/motor below which the implement no longer operates effectively. Accordingly, in some instances, stall may occur when the engine/motor load causes the engine/motor speed to slow below a speed at which the engine/motor ceases to rotate. In other embodiments, stall may occur at an engine/motor speed in excess of a speed at which the engine/motor ceases rotation. For example, stall may be defined as an engine/motor speed below which a lawn mower cutting deck ceases to effectively cut grass, even though such a motor/engine speed will not actually result in the motor/engine ceasing rotation.

In some embodiments, systems and method as described herein may be incorporated into an electronic controller (EC) that is otherwise adapted to control, based on detected operator inputs and sensed vehicle parameters, various functions of the vehicle and/or provide various information to an operator through an interactive display (ID) in communication with the EC. Examples of such a system are described in, for example, U.S. Pat Pub. No. 2017-0196164 to Bryant et al. However, embodiments, wherein the EC is dedicated to stall inhibition are also contemplated.

With reference to the figures of the drawing, wherein like reference numerals designate like parts and assemblies throughout the several views, FIG. 1 illustrates a turf maintenance vehicle in accordance with one exemplary embodiment of the present disclosure. While shown in this view as a self-propelled, turf maintenance vehicle, e.g., a zero-turning-radius riding lawn mower 100 (also referred to herein simply as a "vehicle" or "mower"), such a configuration is not limiting. That is, while embodiments are described herein with respect to a riding mower, those of skill in the art will realize that this disclosure is equally applicable to other types of mowers, as well as to other types of turf maintenance vehicles (e.g., aerators, spreader/sprayers, dethatchers, debris management systems (e.g., blowers, vacuums, sweeper, etc.), general purpose utility vehicles, and the like) without limitation.

It is noted that the term "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the other part/feature (e.g., part/feature identified with a "b" suffix). Similarly, the description of a part/feature identified with no suffix may apply, unless noted otherwise, to both the corresponding left and right part/feature.

As shown in FIG. 1, the mower 100 may include a frame or chassis 102 that supports a prime mover. The prime mover may, in the embodiment shown, be configured as an internal combustion engine 104 (although other power sources, e.g., electric motors, are also possible). The chassis 102 may be supported upon the ground surface 103 by ground-engaging members that, in one embodiment, include left and right ground-engaging drive wheels 106 coupled to left and right sides of a rear portion of the mower 100 (e.g., only right drive wheel 106b visible, but left drive wheel is generally a mirror image (see also FIG. 3)). The drive wheels 106 may be independently powered by the engine (e.g., via one or more hydraulic motors, transmissions, transaxles, or the equivalent) so that the drive wheels 106 may independently rotate (relative to the chassis) and selectively propel the mower 100 over the ground surface 103. While a single prime mover (e.g., engine 104) may power both the vehicle wheels and an implement (e.g., cutting deck), other embodiments may utilize two or more prime movers (e.g., different prime movers for propulsion and for implement power) without departing from the scope of this disclosure.

One or more controls, e.g., left and right drive control levers 110 (left lever 110a, right lever 110b) may also be provided. The drive control levers 110 are pivotally coupled to the mower such that they may pivot forwardly and rearwardly under the control of an operator sitting in an operator's seat 112. The drive control levers 110 are operable to independently control speed and direction of their respective drive wheels 106 via manipulation of the mower's drive system as is known in the art. While illustrated herein as incorporating separate drive control levers 110, other controls, e.g., single or multiple joysticks or joystick-type levers, steering wheels, etc. may also be used without departing from the scope of the disclosure. In the illustrated embodiment, a pair of front swiveling ground-engaging members (e.g., caster wheels 108a, 108b) may support a front portion of the mower 100 in rolling engagement with the ground surface 103. Of course, other drive configurations (e.g., actively steered front and/or rear wheels, tri-wheel configurations) and vehicles using ground-engaging members other than wheels (e.g., tracks, rollers) are certainly contemplated within the scope of this disclosure.

An implement adapted to perform a maintenance task, e.g., a lawn mower cutting deck 114, may be connected to, or otherwise carried by, the chassis 102 of the mower 100, e.g., generally between the drive wheels 106 and the caster wheels 108. The cutting deck 114 may include a deck housing 117 that partially defines an enclosure forming a downwardly-opening cutting chamber (not shown). The cutting chamber may partially surround one or more rotatable cutting blades (also not shown), each attached to a blade spindle assembly as is known in the art. Of course, other cutting decks (e.g., out-front decks, towed decks, reel units, etc.), as well as other implements, are contemplated within the scope of this disclosure.

During operation, power is selectively delivered to the cutting deck 114 (e.g., to the spindle assemblies) and the drive wheels 106, whereby the cutting blades rotate at a speed sufficient to sever grass and other vegetation as the deck passes over the ground surface 103. Typically, the cutting deck 114 includes an operator-selectable height-of-cut control system 115 to allow deck height adjustment relative to the ground surface 103. The cutting deck 114 may optionally include anti-scalp rollers 113 as shown in FIG. 1 to assist in reducing blade/ground contact.

Figure 2:
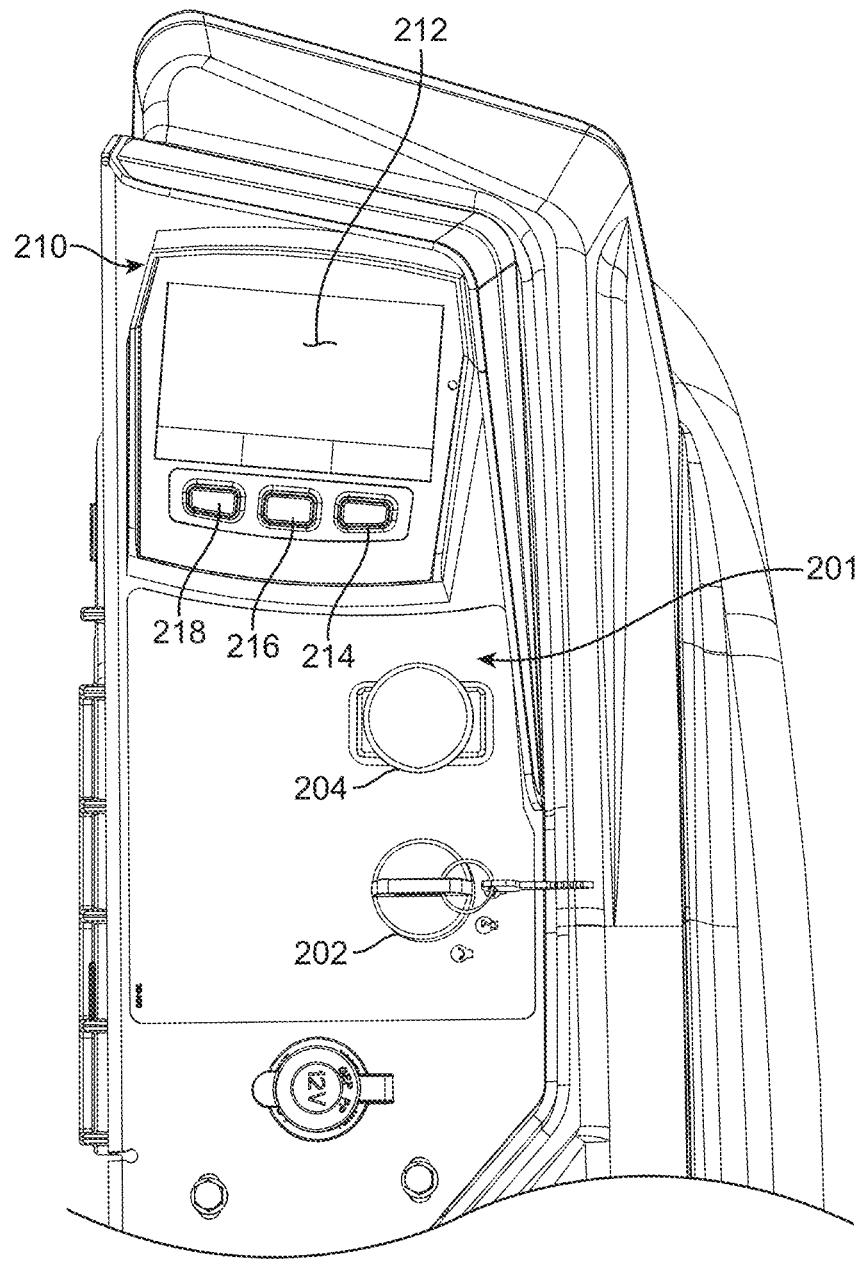
FIG. 2 is an enlarged partial view of a vehicle control area isolated from the remainder of the vehicle of FIG. 1, the control area illustrating an exemplary input/output (I/O) device, the I/O device configured as an interactive display (ID)

With this general overview, an embodiment of an exemplary control system 200 will now be described. As shown in FIG. 1, the control system 200 may include a control area or panel 201, an exemplary embodiment of which is illustrated in more detail in FIG. 2. The control panel 201 may be positioned on the mower at a location that is conveniently accessible to the operator while sitting in the operator's seat 112 (see FIG. 1). While not wishing to be bound to any specific configuration, the control panel 201 may include operator-selectable controls (e.g., switches) configured to provide inputs to the control system 200, an embodiment of which is shown schematically in FIG. 3. For example, the control panel 201 may include a key/ignition switch 202 (not shown in FIG. 3) for starting the engine 104 or otherwise activating the vehicle's electrical system. Moreover, the control panel may include a display screen 212 associated with an interactive display (ID) 210. The ID may present vehicle information including, but not limited to, accumulated engine run time (hour meter), engine temperature, engine RPM, fuel level, interlock (e.g., PTO (clutch) mechanism, park brake, etc.) status, and other messages helpful to vehicle operation. For example, as further described below, the ID 210 may also provide information regarding engine stall.

In the illustrated embodiment, the control panel 201 may also include a user-selectable PTO engagement switch 204. The exemplary PTO engagement switch 204 may be configured as a two-setting (e.g., push (off state) and pull (on state)) mechanical switch. While the PTO engagement switch 204 (as well as other switches described herein) is described and illustrated herein as a mechanical switch that physically moves between its different switch positions, the term "switch," as used herein, is understood to encompass most any device that may allow actuation of a device or system or otherwise selectively allow a change in setting of the device or system. For example, switches as described herein may be non-movable switches such as capacitive sense and optical switches. In still other embodiments, "switch" may refer to other types of moving or non-moving actuation devices including, for example, touch screen elements, pressure-sensitive elements, and the like. As a result, the term "position" (as used herein with respect to a switch), is understood to also encompass any distinct manipulation or output provided by a non-movable switch. Moreover, the term "movable" and its variations (as again used herein to describe aspects of a switch), are understood to include any manipulation of the switch that results in altering the switch's setting or output, regardless of whether this manipulation is accompanied by actual physical movement of the switch.

The control panel 201 may further include the ID 210. The ID 210 may form an interface for interacting with the EC (which is indicated by reference numeral 220 in FIG. 3) and various vehicle systems. In addition to the screen 212, the ID also includes, in one embodiment, one or more (e.g., three) discrete inputs or input elements that allow operator selection/interaction with the information presented on the screen 212. In some embodiments, the inputs are configured as three physical, push-button switches 214, 216, and 218 whose particular function changes in correspondence with information presented on the screen 212. However, as indicated above, the input elements could take most any form (e.g., touch screen elements or other types of mechanical or optical switches) without departing from the scope of this disclosure. While illustrated herein as two separate components, the EC and ID may be constructed as one integral module.

As further described below, the system 200 (e.g., the EC 220) may, in addition to performing stall inhibition functions, monitor various other functions and processes regarding vehicle operation. For example, the EC may monitor vehicle parameters via one or more sensors or switch(es) 223 (see FIG. 3). These sensor(s)/switch(es) 223 may include (but are not limited to): a PTO current sensor; a voltage sensor; an engine and/or transmission temperature sensor; an engine oil pressure sensor, an operator presence sensor (e.g., seat switch); a drive lever 110 position (e.g., neutral) sensor; a ground speed sensor, parking brake position sensor, etc. The signals from these sensors/switch(es) 223, which may be connected to a vehicle controller area network (CAN) bus, may be utilized as inputs to other vehicle functions, e.g., they may operate as interlocks that must be satisfied before various mower operations begin.

Figure 3:
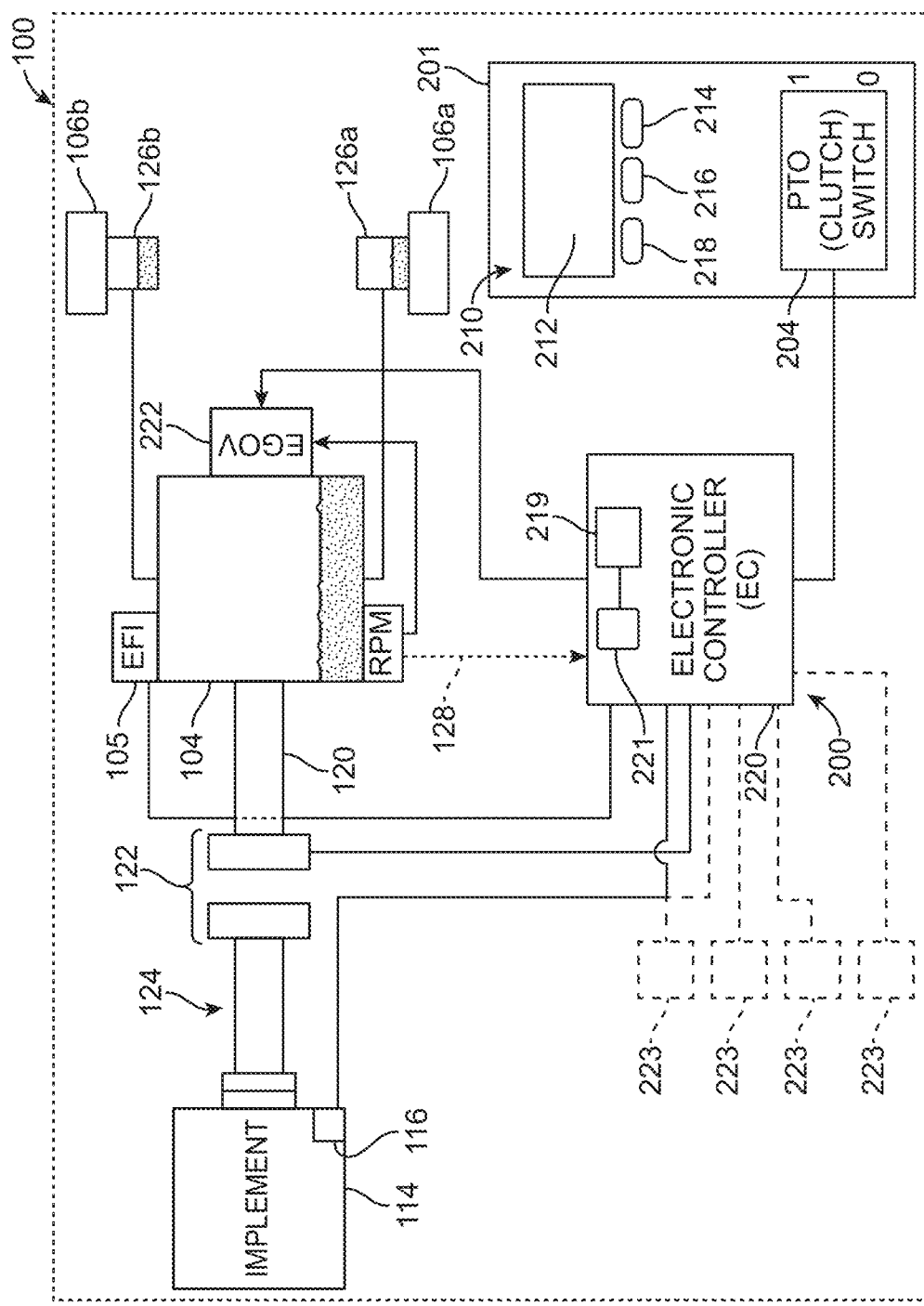
FIG. 3 is a schematic view of vehicle components illustrating aspects of an anti-stall system in accordance with embodiments of the present disclosure.

As shown in FIG. 3, the EC 220, which may be carried on the chassis 102, may include a processor 221, memory 219, and other components necessary or beneficial to EC operation. The memory 219 may include computer-readable instructions that, when executed, e.g., by the processor 221, cause the EC 220 to perform various functions. The memory 219 may include any volatile, non-volatile, magnetic, optical, and/or electrical media, such as a random access memory (RAM), read-only memory (ROM), non-volatile RAM (NVRAM), electrically-erasable programmable ROM (EEPROM), flash memory, and/or any other digital media. While shown as both being incorporated into the EC 220, the memory and the processor could be contained in separate modules. Moreover, the EC 220 could be combined with an engine-specific control module so that all electronic functions of the vehicle and engine are combined into one component.

The processor 221 of the EC 220 may include any one or more of a microprocessor, a controller, a digital signal processor (DSP), an application specific integrated circuit (ASIC), a field-programmable gate array (FPGA), and/or equivalent discrete or integrated logic circuitry. In some examples, the processor 221 may include multiple components, such as any combination of one or more microprocessors, one or more controllers, one or more DSPs, one or more ASICs, and/or one or more FPGAs, as well as other discrete or integrated logic circuitry. The functions attributed to the EC 220/processor 221 herein may be embodied as software, firmware, hardware, or any combination thereof. While described herein as a processor-based system, an alternative EC could utilize other components such as relays and timers to achieve the desired results, either alone or in combination with a microprocessor-based system.

In one or more embodiments, the exemplary systems, methods, and interfaces may be implemented using one or more computer programs using a computing apparatus such as the processor 221 and memory 219. Program code and/or logic described herein may be applied to input data to perform functionality described herein and generate desired output information. The output information may be applied as an input to one or more other devices and/or methods as described herein or as would be applied in a known fashion. In view of the above, it will be readily apparent that the EC functionality as described herein may be implemented in any manner known to one skilled in the art.

FIG. 3 is an exemplary, schematic diagram of portions of the control system 200 of the mower 100. As shown herein, the mower 100 may be configured as a zero-radius-turning mower driven by a wheel drive system having dual hydrostatic transmissions 126 (126a, 126b), each powered by the engine 104 (e.g., via one or more drive belts, not shown). Each transmission 126 may independently control the speed and direction of its respective drive wheel 106 based upon input provided by the operator, e.g., via the respective drive control levers 110 (see FIG. 1). Accordingly, the mower may be directed over the ground surface 103 in the desired direction and at the desired speed via the wheel drive system.

To selectively provide power to the cutting deck 114 (or other implement), the engine 104 may include an output or drive shaft 120 configured to operatively couple to, and decouple from, an input of an implement drive system 124 under the control of an engagement mechanism or PTO 122. In one embodiment, the implement drive system 124 (which could be, e.g., a belt drive or a shaft drive system) may be connected to the implement (e.g., to the cutting deck 114) and selectively rotated by the engine 104 when the PTO 122 (disposed between the implement drive system and the drive shaft 120 of the engine) is energized or otherwise engaged.

As used herein, the term "PTO" may include most any controlled engagement system including, for example, a conventional electro-magnetic clutch, a continuously variable transmission device, or any other equivalent power transmission system. In embodiments wherein the PTO is configured as a clutch, the PTO may be energized (e.g., the PTO may be engaged (placed into an engaged state) whereby it operatively connects or couples an output of the engine to an input of the implement/implement drive system 124 to provide power to the latter) by an electric current provided to the clutch, producing a magnetic field that draws two opposing clutch components (see, e.g., FIG. 3) tightly together, effectively permitting transmission of torque through the clutch. To disengage-the PTO 122 (e.g., to de-energize the clutch (place it into a disengaged state) whereby the engine is disconnected or de-coupled from the implement/implement drive system), the electric current is terminated. Once the current is terminated, the clutch components may separate, mechanically disconnecting or de-coupling the implement drive system 124 from the drive shaft 120.

In the illustrated embodiment of FIG. 3, the engine 104 may include an electronic governor (EGOV) 222 and, optionally, an electronic fuel-injection (EFI) system 105, wherein the EGOV is capable of changing or otherwise regulating engine speed. As used herein, the term "electronic governor" or "EGOV" may include most any system operable to electrically control and/or regulate engine speed. Moreover, a system incorporating EGOV in accordance with embodiments of the present disclosure may be used with or without an EFI system. For example, EGOV can be used with a diesel engine and with a carbureted engine without issue. Engine speed may be provided by a tachometer or revolutions per minute (RPM) sensor providing a feedback signal 128.

While described above in the context of an engine using an electronic governor, such a configuration is not limiting. For example, embodiments of the present disclosure may find application to engines having mechanical governors as well as to non-governed engines.

As also shown in FIG. 3, the control system 200 may include, among other components, the control panel 201 and its associated controls (e.g., PTO switch 204, ID 210 (including switches 214, 216, and 218)), as well as the EC 220. The EC 220 is configured to receive electrical input signals from, among others, the switches 204, 214, 216, and 218. The EC 220 may then transmit, based upon pre-programmed logic, electrical command signals to the engine 104 (e.g., an engine speed command (signal) to the EGOV 222) as described herein, as well as to the PTO 122 (e.g., a PTO command (signal)). For example, when the operator engages the PTO switch 204, the EC may receive a signal and command the PTO 122 to engage. In some embodiments, the EC 220 may vary engine speed in accordance with a predefined engagement profile as the PTO is engaged.

Once the PTO 122 is engaged, the mower 100 may be propelled over the ground surface to perform the grass cutting function. During such operation of the mower 100, conditions including wet or tall grass may increase the load on the engine 104. That is, certain operating conditions may require the engine to increase output to maintain desired engine/cutting blade speed. If the load increases above a threshold, the engine may be unable to maintain speed. Should the load continue to increase, and the engine speed continue to drop, engine stall may occur.

To minimize the occurrence of stall, operators sometimes alter mower operational parameters by, for example, increasing engine speed, or slowing vehicle ground speed. While effective, such actions may become tedious over extended periods of time, and may further result in increased fuel usage. Moreover, even when such actions are taken, the potential for engine stall is still present.

Embodiments of the present disclosure may, however, inhibit or even eliminate engine stall resulting from increasing implement load. Broadly speaking, systems and methods in accordance with some embodiments of the present disclosure may achieve such a benefit by monitoring engine speed during implement operation. When engine speed falls below a speed threshold ($S_{thresh}$), the EC 220 may disengage the PTO 122, thereby unloading the engine before it reaches a stall condition. Systems and methods as described herein may also require certain operator actions (e.g., cycling of the PTO switch 204) before the PTO 122 can be re-engaged.

While described herein as utilizing engine speed as an input for impending stall, such a configuration is not limiting. For example, alternatively or in addition to engine speed, the EC may monitor implement (e.g., cutting deck) speed via a sensor 116 as shown in FIG. 3 (as used herein, the "speed" of the implement (e.g., cutting deck) refers to the speed of a tool (e.g., cutting blade) associated with the implement). The sensor 116 may provide a speed signal to the EC as indicated in FIG. 3. The speed of the implement may correlate to a speed of the engine and, therefore, may be a suitable alternative input for detecting impending stall.

In addition to implement speed, embodiments of the present disclosure may allow observation of engine speed via other indirect engine/system parameters. For instance, instead of directly measuring engine or implement speed, alternative embodiments may measure or sense an indirect surrogate of engine speed or change in engine speed. Such parameters may include, for example, engine throttle plate position, manifold pressure, injector duty cycle, wide open throttle (WOT) position, etc. Accordingly, as used herein, the term "speed" is understood to include both direct measurement (e.g., via a tachometer sensor), as well as indirect measurement of speed (e.g., via a parameter that is indicative of engine speed and/or a change in engine speed). Of course, in these alternative embodiments, $S_{thresh}$ would be reflective of a relevant threshold of the actual parameter monitored rather than a threshold of direct engine/implement speed.

Figure 4:
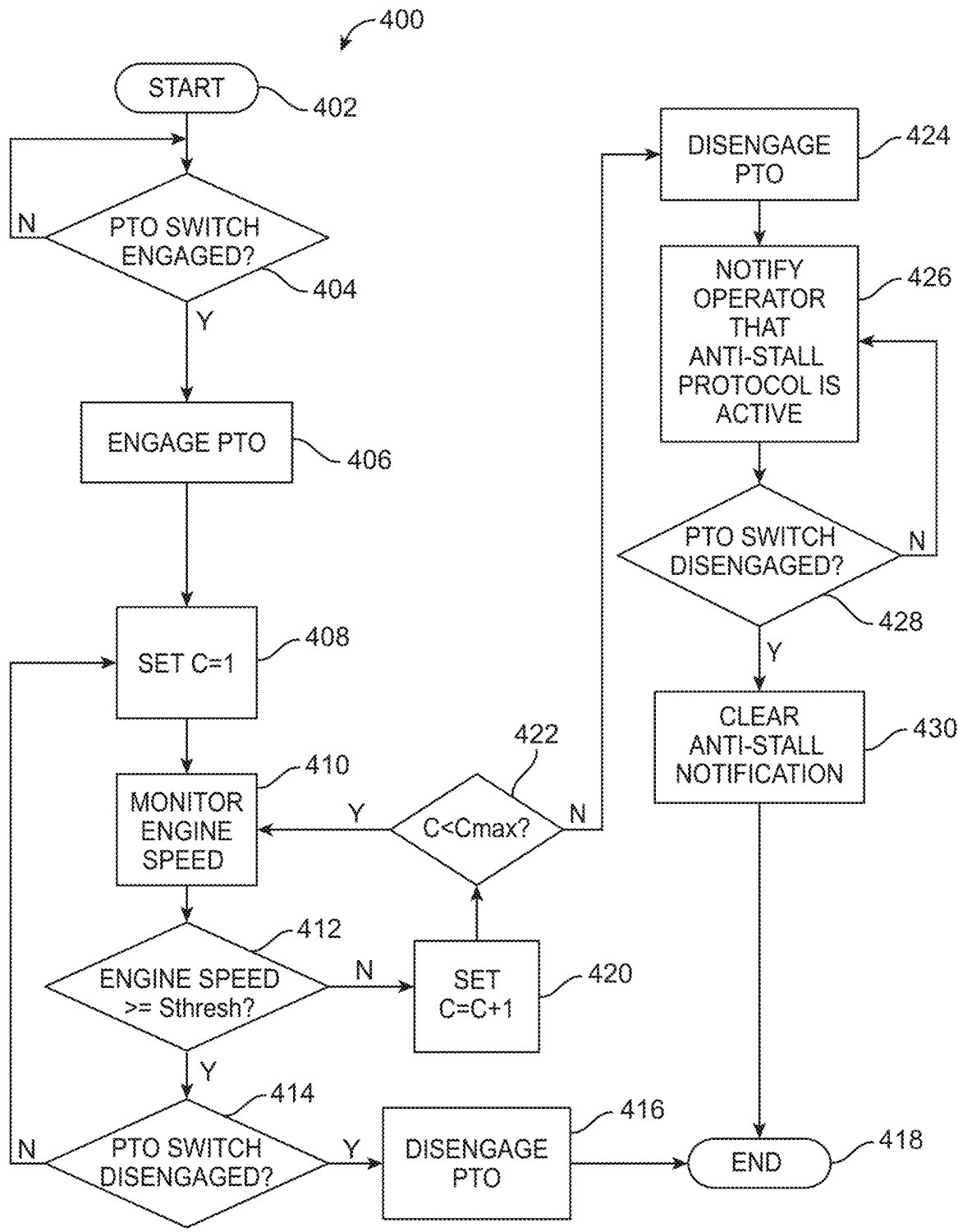
FIG. 4 is a flow chart illustrating an exemplary method for inhibiting stall of a prime mover of a turf maintenance vehicle.

A method 400 for inhibiting engine stall in accordance with embodiments of the present disclosure is illustrated in FIG. 4. As shown in this view, the process is entered at 402. The EC 220 may monitor the status of the PTO switch 204 (see FIG. 2) and detect whether it is engaged or not at 404. If the switch 204 is disengaged, the process continues to monitor for engagement.

Once the switch is engaged, however, the EC 220 commands the PTO 122 to engage at 406 and then sets a timer or counter C equal to 1 at 408. With the implement (cutting deck 114) engaged, the operator may then commence mowing.

During mowing, the EC 220 may continue to monitor engine speed (via signal 128 in FIG. 3) at 410. If the engine speed remains at or above the speed threshold $S_{thresh}$ at 412, the EC 220 continues to monitor the status of the PTO switch 204 at 414. If the switch stays engaged, control returns to 408. However, if the switch 204 is disengaged at 414, the EC 220 issues a command to disengage the PTO at 416 and the process ends at 418.

Figure 5:
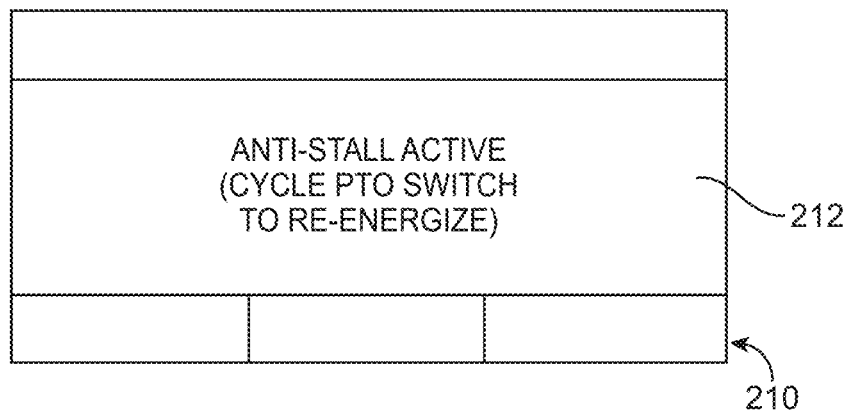
FIG. 5 is an exemplary visual notification indicating that the anti-stall system is active.

If, on the other hand, the engine speed falls below the speed threshold $S_{thresh}$ at 412, the counter C is incremented by one at 420 and the value of C is compared to a threshold period of time $C_{max}$ at 422. If C is determined to be less than $C_{max}$ at 422, control may return to 410. However, if C is determined to be greater than or equal to $C_{max}$ at 422, the EC 220 may disengage the PTO at 424 and notify the operator at 426 that the anti-stall system has taken action (e.g., disengaged the PTO) to avoid stall. Such notification may be provided, in some embodiments, via a message such as "Anti-Stall Active" displayed on the ID 210 as shown in FIG. 5. However, alternative notifications (e.g., via other visible, audible, or tactile feedback) are certainly possible.

In the process illustrated in FIG. 4, the EC 220 may then wait for the PTO switch 204 to be disengaged at 428, after which the notification provided at 426 is cleared at 430 and the process ends at 418 (in practice, control may continuously loop back to 404 to determine the status of the PTO switch).

While illustrated in FIG. 4 as utilizing a linear counter (timer) to determine when to disengage the PTO, such a configuration is exemplary only. For example, other embodiments may initiate PTO disengagement upon detection of a rate of engine speed decrease to ensure disengagement occurs more rapidly when necessary. Other embodiments may disengage the PTO when a magnitude of error of the engine speed command to the actual engine speed reaches a certain level. In fact, most any linear or non-linear function may be utilized in place of the linear counter illustrated in FIG. 4 without departing from the scope of this disclosure. Once again, in these alternative embodiments, the "threshold" ($S_{thresh}$) that the EC may monitor may not be engine/implement speed threshold, but rather a threshold relevant to rate of change of engine speed, level of error in actual speed to commanded speed, etc.

The variables $S_{thresh}$ and $C_{max}$ may differ based upon various parameters (e.g., engine power). However, with a conventional diesel internal combustion engine suitable for use in a commercial ZTR lawn mower, values of $S_{thresh}$ may typically fall within a range of 1200-2500 RPM with $C_{max}$ values of 0-3 seconds. Of course, these ranges are exemplary only, and other ranges are certainly possible without departing from the scope of this disclosure. Moreover, these numbers may vary for other types of prime movers (e.g., electric motors) and other types of implements.

Systems and methods in accordance with embodiments of the present disclosure may thus inhibit implement-induced engine stall by automatically disengaging the PTO connecting the engine to the implement once the engine reaches a threshold speed below which stall may occur. As a result, issues related to premature engine shutdown (e.g., overheating) may be minimized by allowing the engine to recover and return to normal operating speed.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A method for inhibiting implement-induced stall of a prime mover powering a turf maintenance vehicle, the method comprising:
monitoring, with an electronic controller (EC) associated with the vehicle, one or both of a speed of the prime mover and a speed of an implement powered by the prime mover while a power take-off (PTO) operatively connecting an output of the prime mover to the implement is engaged and the implement is performing an associated maintenance task;
detecting, with the EC, when one or both of the speed of the prime mover and the speed of the implement falls below a speed threshold; and automatically disengaging, with the EC, the PTO to operatively disconnect the prime mover from the implement before the prime mover stalls.

2. The method of claim 1, wherein detecting when one or both of the speed of the prime mover and the speed of the implement falls below the speed threshold comprises detecting when the speed of the prime mover falls below the speed threshold for a threshold period of time.

3. The method of claim 2, wherein the threshold period of time comprises a range of 0 seconds to 3 seconds.

4. The method of claim 1, further comprising issuing a notification with the EC indicating that the PTO has been disengaged.

5. The method of claim 4, wherein issuing the notification comprises displaying a message on a display associated with the vehicle.

6. The method of claim 1, further comprising re-engaging the PTO by cycling a PTO engagement switch.

7. The method of claim 1, wherein the prime mover comprises an internal combustion engine.

8. The method of claim 1, wherein the implement comprises a cutting deck.

9. The method of claim 1, wherein automatically disengaging the PTO comprises de-energizing a clutch operatively positioned between the prime mover and the implement.

10. A method for inhibiting implement-induced stall of an engine powering a turf maintenance vehicle, comprising:
engaging a power take-off (PTO) to operatively connect an output of the engine to an input of a cutting deck attached to the vehicle;
operating the cutting deck while the vehicle is travelling over a ground surface;
monitoring, with an electronic controller (EC) associated with the vehicle, one or both of: a speed of the engine; and a speed of the cutting deck;
detecting, with the EC, when one or both of the speed of the engine and the speed of the cutting deck falls below a speed threshold; and
automatically disengaging, with the EC, the PTO to operatively disconnect the engine from the cutting deck when one or both of the speed of the engine and the speed of the cutting deck falls below the speed threshold.

11. The method of claim 10, further comprising issuing a notification that the EC has automatically disengaged the PTO.

12. The method of claim 11, wherein issuing the notification comprises displaying a message on a display screen attached to the vehicle.

13. The method of claim 10, further comprising re-engaging the PTO by cycling a PTO engagement switch.

14. The method of claim 10, wherein automatically disengaging the PTO occurs when one or both of the speed of the engine and the speed of the cutting deck falls below the speed threshold for a threshold period of time.

15. The method of claim 14, wherein the threshold period of time comprises a range of 0 seconds to 3 seconds.

16. A turf maintenance vehicle comprising:
a chassis;
ground-engaging members supporting the chassis upon a ground surface;
an implement attached to the chassis and adapted to perform a turf maintenance function;
a prime mover supported by the chassis and adapted to power the implement;
a power take-off (PTO) adapted to selectively couple an output of the prime mover to an input of the implement to provide power the implement; and
an electronic controller (EC) associated with the PTO, the EC adapted to monitor one or both of a speed of the prime mover and a speed of the implement while the implement is performing an associated maintenance task, wherein the EC is adapted to detect when one or both of the speed of the prime mover and the speed of the implement falls below a speed threshold, and automatically disengage the PTO to operatively de-couple the prime mover from the implement when one or both of the speed of the prime mover and the speed of the implement falls below the speed threshold.

17. The vehicle of claim 16, wherein the implement comprises a cutting deck.

18. The vehicle of claim 16, wherein the prime mover comprises an internal combustion engine.

19. The vehicle of claim 16, wherein the EC disengages the PTO when one or both of the speed the prime mover and the speed of the implement falls below the speed threshold for a threshold period of time, the threshold period of time being between 0 seconds and 3 seconds.

* * * * *